US012322366B2

(12) United States Patent
Kato

(10) Patent No.: US 12,322,366 B2
(45) Date of Patent: Jun. 3, 2025

(54) MASKING SOUND ADJUSTMENT METHOD AND MASKING SOUND ADJUSTMENT DEVICE

(71) Applicant: YAMAHA CORPORATION, Hamamatsu (JP)

(72) Inventor: Shinichi Kato, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 0 days.

(21) Appl. No.: 18/642,958

(22) Filed: Apr. 23, 2024

(65) Prior Publication Data

US 2024/0274110 A1 Aug. 15, 2024

Related U.S. Application Data

(60) Division of application No. 18/080,087, filed on Dec. 13, 2022, now Pat. No. 11,996,073, which is a continuation of application No. PCT/JP2021/027280, filed on Jul. 21, 2021.

(30) Foreign Application Priority Data

Aug. 7, 2020 (JP) ................................ 2020-134495

(51) Int. Cl.
*G10K 11/175* (2006.01)
*G10K 11/178* (2006.01)

(52) U.S. Cl.
CPC ...... *G10K 11/1754* (2020.05); *G10K 11/1781* (2018.01)

(58) Field of Classification Search
CPC ........................ G10K 11/1754; G10K 11/1781
USPC ........................................................ 381/73.1
See application file for complete search history.

(56) References Cited

U.S. PATENT DOCUMENTS 3,985,957 A * 10/1976 Torn .................. G10K 11/1754 181/154
10,440,467 B1 * 10/2019 You .................... G10K 11/1754
2015/0256930 A1 * 9/2015 Yamakawa .............. H04K 3/43 704/205

(Continued)

FOREIGN PATENT DOCUMENTS

EP 2919229 A1 9/2015
EP 3070709 A1 9/2016

(Continued)

OTHER PUBLICATIONS

International Search Report issued in International Appln. No. PCT/JP2021/027280 mailed Oct. 19, 2021. English translation provided.

(Continued)

*Primary Examiner* — David L Ton
(74) *Attorney, Agent, or Firm* — ROSSI, KIMMS & McDOWELL LLP

(57) ABSTRACT

A masking sound adjustment method includes obtaining, in each of a plurality of frequency bands, a volume adjustment amount of a masking sound with respect to a volume of a conversation sound to be masked, based on a threshold value corresponding to a target word intelligibility of the conversation sound to be masked; and adjusting a volume of the masking sound in each of the plurality of frequency bands based on the volume adjustment amount.

3 Claims, 8 Drawing Sheets

(56) References Cited

U.S. PATENT DOCUMENTS

| | | | | |
|---|---|---|---|---|
| 2015/0281829 | A1 | 10/2015 | Gauger, Jr. et al. | |
| 2016/0275932 | A1 | 9/2016 | Hata et al. | |
| 2018/0122353 | A1* | 5/2018 | Braasch | G10L 25/18 |

FOREIGN PATENT DOCUMENTS

| | | | |
|---|---|---|---|
| JP | 2011154138 | A | 8/2011 |
| JP | 2012008393 | A | 1/2012 |
| JP | 2013231987 | A | 11/2013 |
| JP | 2015187714 | A | 10/2015 |
| JP | 2016177205 | A | 10/2016 |
| JP | 2017510200 | A | 4/2017 |

OTHER PUBLICATIONS

Written Opinion issued in International Appln. No. PCT/JP2021/027280 mailed Oct. 19, 2021. English translation provided.

Notice of Allowance issued in U.S. Appl. No. 18/080,087 mailed Jan. 24, 2024.

Office Action issued in Japanese Appln. No. 2020-134495 mailed Jul. 30, 2024. English machine translation provided.

* cited by examiner

MASKING SOUND ADJUSTMENT METHOD AND MASKING SOUND ADJUSTMENT DEVICE

CROSS-REFERENCE TO RELATED APPLICATIONS

This is a continuation of International Application No. PCT/JP2021/027280 filed on Jul. 21, 2021, and claims priority from Japanese Patent Application No. 2020-134495 filed on Aug. 7, 2020, the entire content of which is incorporated herein by reference.

TECHNICAL FIELD

An embodiment of the present invention relates to a masking sound adjustment method and a masking sound adjustment device for adjusting a masking sound for masking a conversation sound.

BACKGROUND ART

Patent Literature 1 discloses a masking sound generation device that generates a masking sound for masking a conversation sound.

Patent Literature 2 discloses a masking sound data generation device that adjusts a volume of a masking sound based on different rules for each of two or more frequency bands.

CITATION LIST

Patent Literature

Patent Literature 1: JP-2011-154138-A
Patent Literature 2: JP-2015-187714-A

SUMMARY OF INVENTION

The masking sound is preferably low in a volume so as not to cause discomfort or annoyance to a user. However, when the volume of the masking sound decreases, a masking effect decreases.

Accordingly, an object of an embodiment of the present invention is to provide a masking sound adjustment method and a masking sound adjustment device that reduce a volume of a masking sound while exerting a masking effect.

Solution to Problem

A masking sound adjustment method according to one aspect of the present invention includes: obtaining, in each of a plurality of frequency bands, a volume adjustment amount of a masking sound with respect to a volume of a conversation sound to be masked, based on a threshold value corresponding to a target word intelligibility of the conversation sound to be masked; and adjusting a volume of the masking sound in each of the plurality of frequency bands, based on the volume adjustment amount.

Alternatively, a masking sound adjustment method according to one aspect of the present invention includes: acquiring a masking sound and an auxiliary content sound for assisting the masking sound; outputting the masking sound without outputting masking sounds having frequencies lower than a first frequency and higher than a second frequency; and outputting the auxiliary content sound including auxiliary content sounds having frequencies lower than the first frequency and higher than the second frequency.

According to the embodiment of the present invention, it is possible to reduce the volume of masking sound while exerting the masking effect.

DESCRIPTION OF EMBODIMENTS

Figure 1:
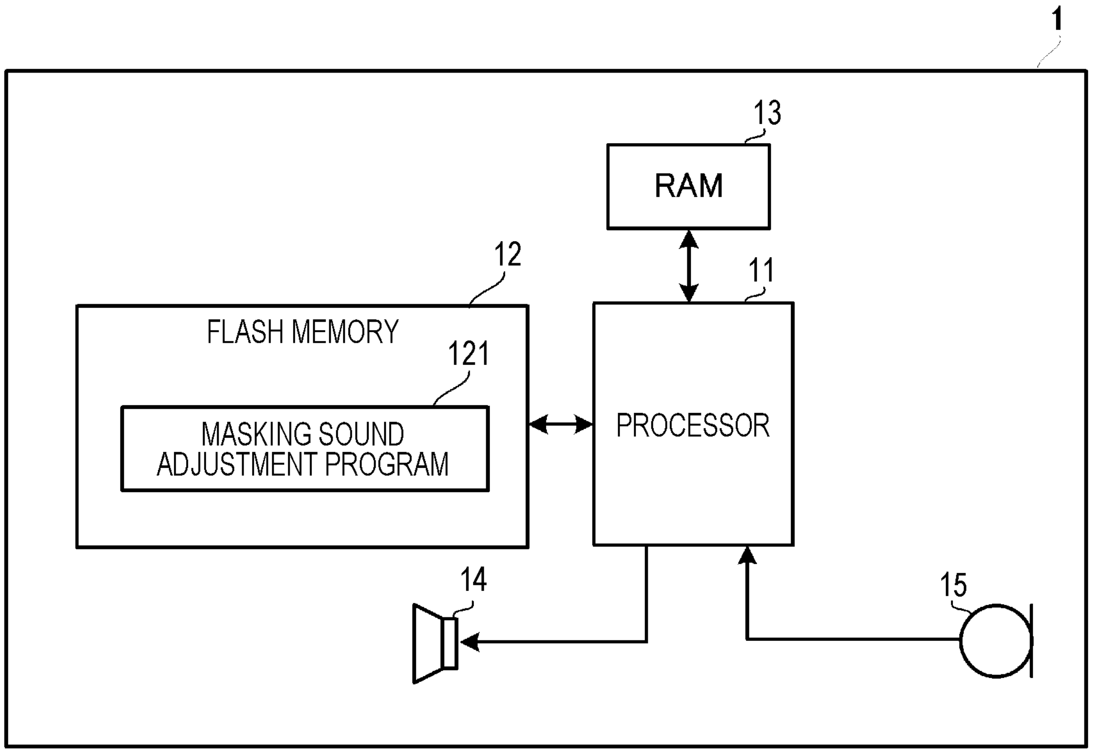
FIG. 1 is a block diagram illustrating a configuration of a masking sound output device 1.

FIG. 1 is a block diagram illustrating a configuration of a masking sound output device 1. The masking sound output device 1 includes a processor 11, a flash memory 12, a RAM 13, a speaker 14, and a microphone 15.

The masking sound output device 1 outputs a masking sound for masking a conversation sound from the speaker 14. The masking sound output device 1 adjusts the masking sound such that the masking sound does not give discomfort or annoyance to the user and exerts a masking effect.

The processor 11 reads a program from the flash memory 12 serving as a storage medium, and temporarily stores the program in the RAM 13, thereby performing various operations. The program includes a masking sound adjustment program 121. The flash memory 12 stores a program for operating the processor 11 such as firmware. In addition, the flash memory 12 stores sound data of a masking sound. The masking sound is, for example, a noise sound. The masking sound may be any sound as long as the masking sound inhibits hearing of the conversation sound. For example, the masking sound may be a disturbance sound for disturbing the hearing of the conversation sound. The disturbance sound is, for example, a conversation sound (a sound having no lexical meaning) obtained by processing the voice of any speaker and whose content cannot be understood.

The program read by the processor 11 does not need to be stored in the flash memory 12 in an own device. For example, the program may be stored in a storage medium of an external device such as a server. In this case, the processor 11 may read the program from the server to the RAM 13 each time and execute the program. In addition, the masking sound does not need to be stored in the flash memory 12. The masking sound may be downloaded from an external device such as a server each time.

The microphone 15 receives the conversation sound. The processor 11 adjusts the volume of the masking sound based on the volume of the conversation sound received by the microphone 15. The voice received by the microphone 15 includes various types of background noise and the like in addition to the voice of a speaker.

Figure 2:
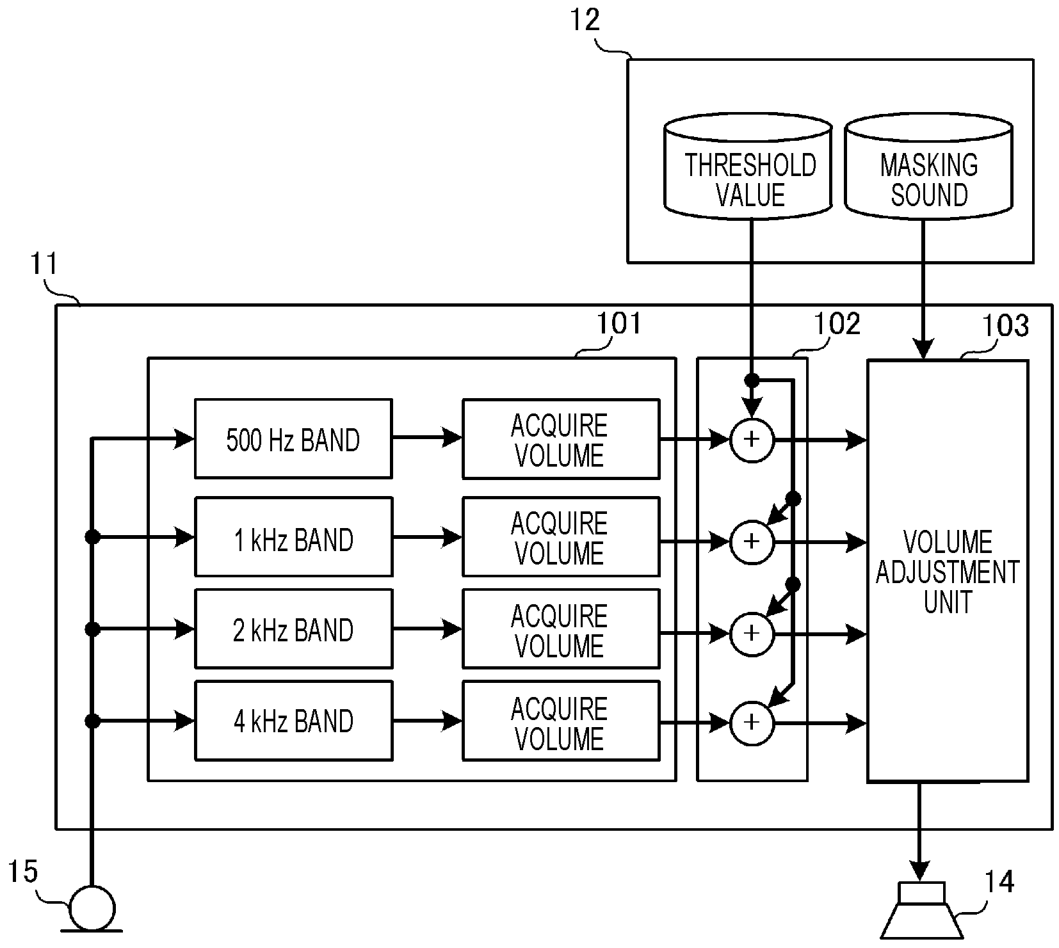
FIG. 2 is a block diagram illustrating a functional configuration of a processor 11.

FIG. 2 is a block diagram illustrating a functional configuration of the processor 11. The processor 11 realizes a masking sound adjustment device according to the present invention. As illustrated in FIG. 2, the processor 11 functionally includes a volume acquisition unit 101, a volume adjustment amount calculation unit 102, and a volume adjustment unit 103. These components are implemented by the masking sound adjustment program 121.

The volume acquisition unit 101 acquires the conversation sound by the microphone 15. The volume adjustment amount calculation unit 102 calculates the volume of the acquired conversation sound. The volume adjustment unit 103 reads a masking sound from the flash memory 12 and adjusts the volume of the masking sound.

Figure 3:
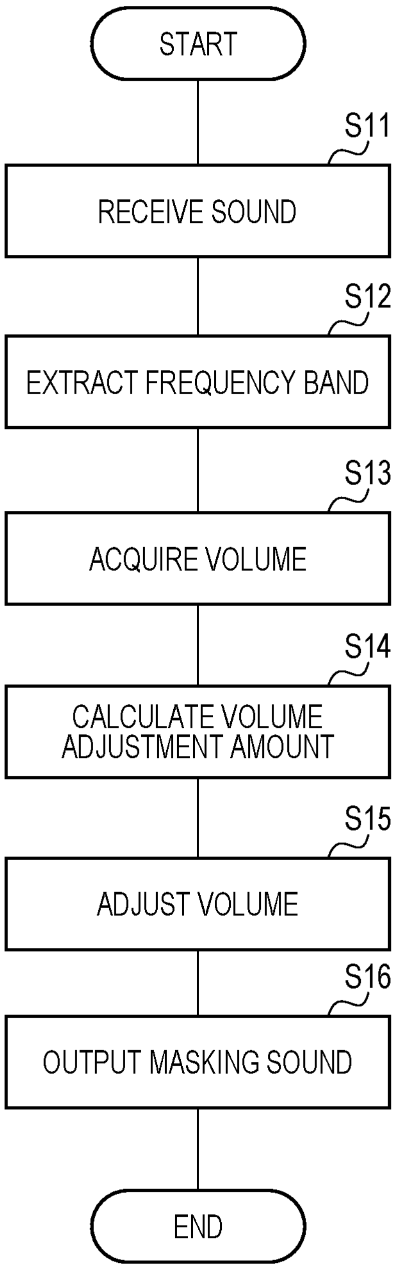
FIG. 3 is a flowchart illustrating a masking sound adjustment method.

FIG. 3 is a flowchart illustrating a masking sound adjustment method. First, the volume acquisition unit 101 receives a conversation sound with the microphone 15 (S11). Then, the volume acquisition unit 101 extracts a plurality of frequency bands from the received sound by a band-pass filter (S12). In the example of FIG. 2, the volume acquisition unit 101 includes four 1/1 octave band filters of a 500 Hz band, a 1 kHz band, a 2 kHz band, and a 4 kHz band. Specifically, the four 1/1 octave band filters pass frequencies of 355 Hz to 710 Hz in the 500 Hz band, 710 Hz to 1.4 kHz in the 1 kHz band, 1.4 kHz to 2.8 kHz in the 2 kHz band, and 2.8 kHz to 5.6 kHz in the 4 kHz band, respectively. As a result, the volume acquisition unit 101 extracts the four frequency bands from a sound signal.

Thereafter, the volume acquisition unit 101 acquires the volume of each of the extracted frequency bands (S13). Then, the volume adjustment amount calculation unit 102 calculates a volume adjustment amount of the masking sound in each of the four frequency bands (S14). The volume adjustment amount calculation unit 102 calculates the volume adjustment amount such that, in each frequency band, a difference between the volume (dB) of the conversation sound and the volume (dB) of the masking sound, that is, a signal to noise ratio (SNR), which is a volume ratio of the conversation sound to the masking sound, is equal to or less than a threshold value based on a target word intelligibility. Since the background noise is also a type of noise, the SNR is expressed by SNR=Signal (volume of the conversation sound)−Noise (volume of the masking sound+volume of the background noise), in which the conversation sound is Signal and the masking sound and the background noise are Noise.

Figure 4:
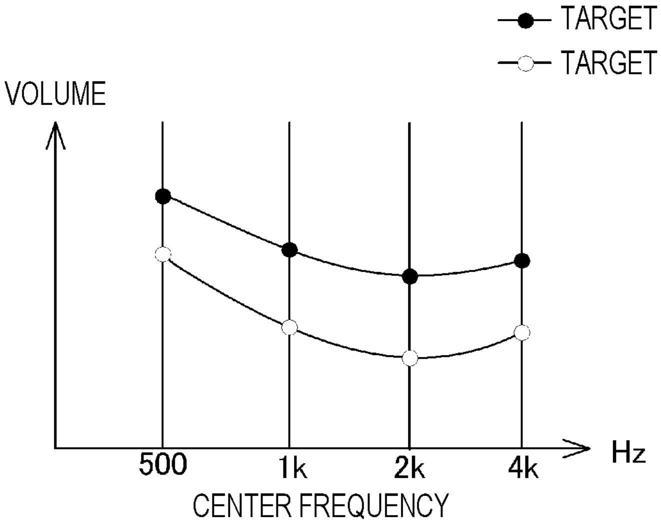
FIG. 4 is a diagram illustrating a threshold value of SNR for each frequency band.

FIG. 4 is a diagram illustrating a threshold value of SNR for each frequency band. In the graph illustrated in FIG. 4, a horizontal axis represents a frequency (Hz), and a vertical axis represents a volume (dB). The threshold value of the SNR is obtained based on the target word intelligibility. The target word intelligibility was obtained by an experiment. The inventors of the present application have made a plurality of listeners listen to word voices and masking sounds (noise sounds) through experiments. The inventors of the present application asked the plurality of listeners to listen to the word voices and the masking sounds under the same SNR, and obtained the number of experimental trials for which the content of a word could be understood with respect to the number of all experimental trials for each band, as the target word intelligibility. That is, the target word intelligibility of 50% means that the number of experimental trials for which the content of the word can be understood is about 50% with respect to the number of all experimental trials. The target word intelligibility of 20% means that the number of experimental trials for which the content of the word can be understood is only about 20% with respect to the number of all experimental trials. It is considered that it is difficult for the listener to understand the content of the conversation with the target word intelligibility of 50%, and it is considered that the listener cannot understand the content of the conversation at all with the target word intelligibility of 20%. That is, when the target word intelligibility is 50%, the masking sound exerts a masking effect. When the target word intelligibility is 20%, the masking sound exerts an extremely strong masking effect.

The inventors of the present application changed the SNR by changing the volume of the masking sound in each of the plurality of frequency bands, and obtained the target word intelligibility for each band. FIG. 4 is the graph illustrating the volume (threshold value) of the SNR with respect to the target word intelligibility based on the experimental results.

From the experimental results illustrated in FIG. 4, it can be seen that the threshold value of the SNR based on the target word intelligibility is the lowest value in the octave band having a center frequency of 1 kHz to 4 kHz. In the experimental results illustrated in FIG. 4, the threshold value is the lowest value in a 1/1 octave band with a center frequency of 2 kHz, and SNR=−15 dB at target word intelligibility of 50%. In addition, the threshold value of the SNR based on the target word intelligibility becomes higher at higher and lower frequencies with the octave band having the center frequency of 2 kHz interposed therebetween.

Therefore, the volume adjustment amount calculation unit 102 can cause the masking sound to exert the masking effect by obtaining the volume adjustment amount of the masking sound such that the SNR becomes-15 dB or less at least in an octave band having the center frequency of 2 kHz.

In order to most efficiently exert the masking effect, it is preferable that the volume adjustment amount calculation unit 102 obtains the volume adjustment amount such that the SNR is equal to or less than the threshold value of the target word intelligibility of 20% in all of the 500 Hz band, the 1 kHz band, the 2 kHz band, and the 4 kHz band.

However, the threshold value of the SNR based on the target word intelligibility is not limited to the value illustrated in the present embodiment.

The threshold value of the SNR for each frequency band illustrated in FIG. 4 is stored in the flash memory 12. The volume adjustment amount calculation unit 102 reads the threshold value of each frequency band from the flash memory 12. The volume adjustment amount calculation unit 102 obtains the volume adjustment amount of the masking sound by adding the volume of each frequency band acquired by the volume acquisition unit 101 to the threshold value of the frequency band.

The volume adjustment unit 103 is formed of, for example, an equalizer. The volume of the masking sound in each band is adjusted by the volume adjustment amount calculated by the volume adjustment amount calculation unit 102 (S15). The volume adjustment unit 103 outputs the masking sound after the volume adjustment to the speaker 14 (S16). As a result, the masking sound output device 1 can reduce the volume of the masking sound while exerting the masking effect. The volume adjustment unit 103 may be a band-pass filter (BPF) and a gain adjuster, instead of the equalizer. In this case, the BPF divides the masking sound into the four frequency bands, and the gain adjuster adjusts a volume of each masking sound.

As described above, the sound acquired by the microphone 15 also includes the background noise. Therefore, the volume adjustment amount calculation unit 102 may obtain the volume adjustment amount of the masking sound by subtracting the volume of the background noise from the threshold value. The volume of the background noise may be a predetermined value, or the volume of the background noise may be obtained from the sound acquired by the microphone 15.

The processor 11 may include a sound source separation unit that removes the background noise from the sound received by the microphone 15 to separate the conversation sound. The sound source separation unit separates the conversation sound using a spectral subtraction, a Wiener filter, or the like that removes the background noise with the conversation sound as a target sound, for example. In this case, the volume acquisition unit 101 acquires the volume of the separated conversation sound. Accordingly, the masking sound output device 1 can further reduce the volume of the masking sound while exerting the masking effect. In addition, in a masking sound adjustment method, the conversation sound and the background noise may be separated from each other depending on the arrangement of the microphone 15 and directivity of the microphone 15. For example, in a case where a position of the speaker is determined as in a table for meeting in an office, in the masking sound adjustment method, the conversation sound can be separated by installing the microphone 15 at the position of the speaker and acquiring only the voice of the speaker at a high volume. In a case where a position of a head of the speaker sitting on a chair is determined, in the masking sound adjustment method, the directivity of the microphone 15 may be directed to the position of the head of the speaker. In addition, in the masking sound adjustment method, another microphone for acquiring the background noise may be set at a place other than the speaker, or directivity may be directed in a direction other than the speaker. In this case, the masking sound adjustment method may remove the background noise from the sound acquired by the microphone 15 using the background noise acquired by the microphone. In an octave band having a center frequency of lower than 500 Hz and an octave band having a center frequency of higher than 4 kHz, the target word intelligibility is not affected regardless of the SNR. That is, the volume of the octave band having the center frequency of lower than 500 Hz and the volume of the octave band having the center frequency of higher than 4 kHz do not affect the masking effect. From this, it can be seen that masking sounds in the octave band having the center frequency of lower than 500 Hz and in the octave band having the center frequency of higher than 4 kHz are not necessary.

Figure 5:
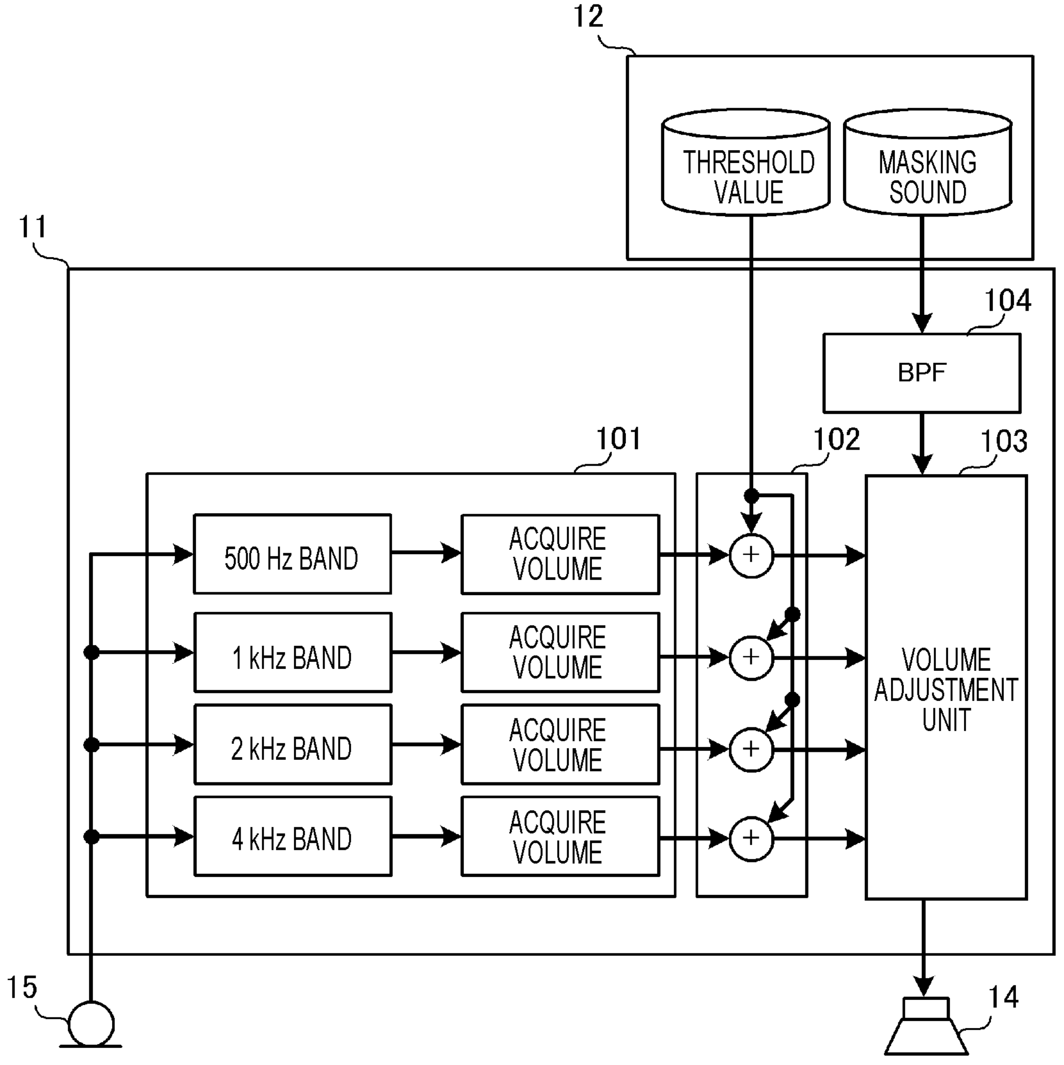
FIG. 5 is a block diagram illustrating a functional configuration of the processor 11 according to a first modification.

FIG. 5 is a block diagram illustrating a functional configuration of the processor 11 according to a first modification. The same components as those in FIG. 2 are denoted by the same reference numerals, and the description thereof will be omitted.

The processor 11 further includes a band-pass filter (BPF) 104. The BPF 104 corresponds to a band limiting unit. A lower limit frequency of the BPF 104 coincides with a lower limit frequency 355 Hz of the octave band filter having a center frequency of 500 Hz. An upper limit frequency of the BPF 104 coincides with an upper limit frequency 5.6 kHz of the octave band filter having a center frequency of 4 kHz. Thus, the BPF 104 limits masking sounds in the octave band having the center frequency of lower than 500 Hz and in the octave band having the center frequency of higher than 4 kHz. Therefore, the processor 11 according to the first modification can further reduce discomfort and annoyance caused by the masking sound while exerting the masking effect.

Figure 6:
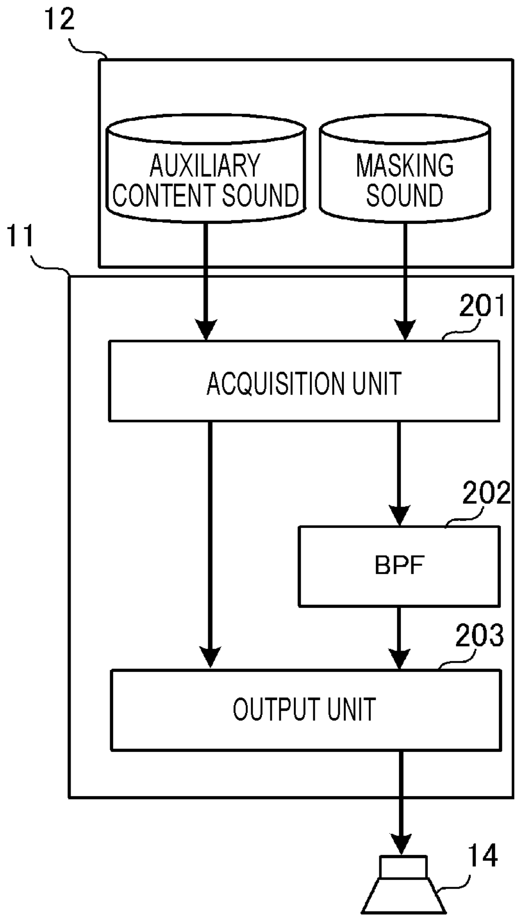
FIG. 6 is a block diagram illustrating a functional configuration of the processor 11 according to a second modification.

Next, FIG. 6 is a block diagram illustrating a functional configuration of the processor 11 according to a second modification. The processor 11 according to the second modification functionally includes an acquisition unit 201, a BPF 202, and an output unit 203. These components are implemented by the masking sound adjustment program 121.

Figure 7:
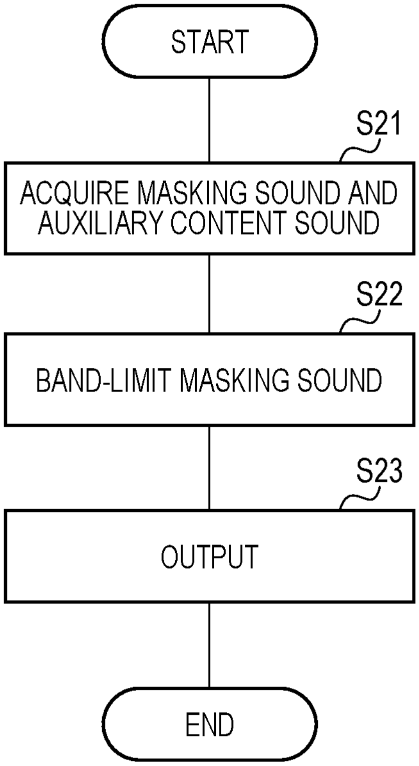
FIG. 7 is a flowchart illustrating a masking sound adjustment method according to the second modification.

FIG. 7 is a flowchart illustrating a masking sound adjustment method according to the second modification. The acquisition unit 201 acquires an auxiliary content sound for assisting the masking sound and the masking sound from the flash memory 12 (S21).

The auxiliary content sound includes, for example, a background sound that is constantly output and a presentation sound that is non-constantly output. The background sound is, for example, a natural sound such as babbling of a river or rustling of trees. The background sound may be a musical sound. The presentation sound is a sound with a high dramatic effect, such as a cry of a bird or an intermittent melody sound, which is repeated at random.

The background sound makes the masking sound less noticeable and reduces discomfort and annoyance caused by the masking sound. The presentation sound attracts attention of a listener to prevent a reduction in the masking effect caused by getting used for the masking sound.

The acquisition unit 201 outputs the masking sound to the BPF 202, and the BPF 202 limits ranges of a frequency of the masking sound, that is lower than a first predetermined frequency and higher than a second predetermined frequency (S22). For example, as described above, the first predetermined frequency is the lower limit frequency (355 Hz) of the octave band having the center frequency of 500 Hz. The second predetermined frequency is, for example, the upper limit frequency (5.6 kHz) of the octave band having the center frequency of 4 kHz.

The masking sound is band-limited by the BPF 202 and input to the output unit 203. On the other hand, the auxiliary content sound is input to the output unit 203 without being band-limited by the BPF 202. That is, the output unit 203 outputs the masking sound while the masking sound in the ranges of the frequency lower than the first predetermined frequency and the frequency higher than the second predetermined frequency is limited, and outputs the auxiliary content sound including ranges of the frequency lower than the first predetermined frequency and the frequency higher than the second predetermined frequency (S23).

As described above, the masking sound has no masking effect in the octave band having the center frequency of lower than 500 Hz and the octave band having the center frequency of higher than 4 kHz. On the other hand, the auxiliary content sound reduces discomfort and annoyance caused by the masking sound and improves the masking effect of the masking sound. The auxiliary content sound reduces discomfort and annoyance caused by the masking sound and improves the masking effect of the masking sound even in a band having the center frequency of lower than 500 Hz and in a band having the center frequency of higher than 4 kHz.

In the masking sound adjustment method according to the second modification, only the auxiliary content sound is output without including the masking sound in the band having the center frequency of lower than 500 Hz and in the band having the center frequency of higher than 4 kHz. Therefore, the masking sound adjustment method according to the second modification can further emphasize the auxiliary content sound and reduce discomfort and annoyance caused by the masking sound.

Figure 8:
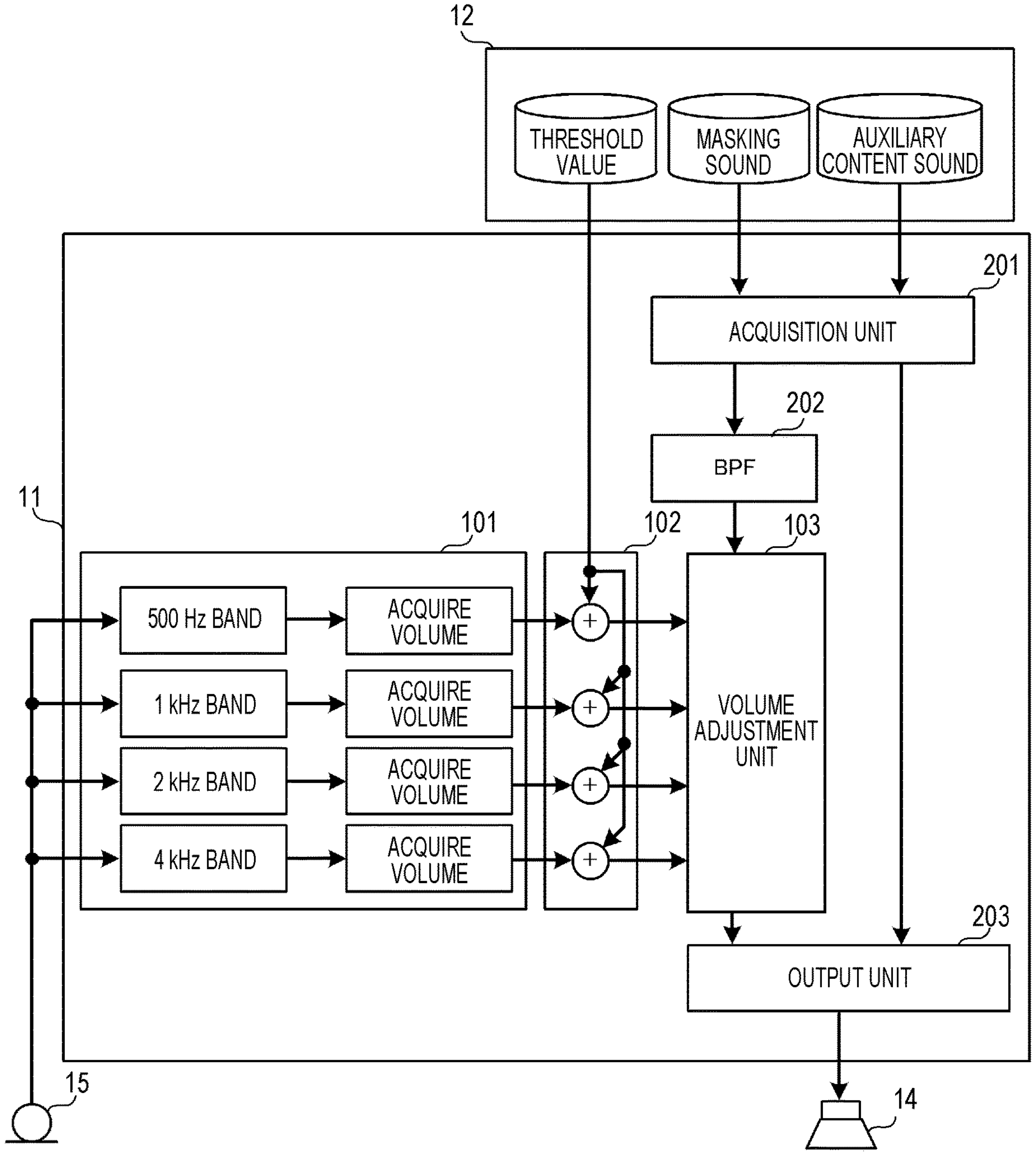
FIG. 8 is a block diagram illustrating a functional configuration of the processor 11 according to a third modification.

The configurations of the first modification and the second modification may be combined. FIG. 8 is a block diagram illustrating a functional configuration of the processor 11 according to a third modification. The same components as those illustrated in FIGS. 5 and 6 are denoted by the same reference numerals, and the description thereof will be omitted.

In the third modification illustrated in FIG. 8, the volume adjustment unit 103 adjusts the volume of the masking sound whose band is limited by the BPF 202. The volume adjustment unit 103 outputs the masking sound whose volume has been adjusted to the output unit 203.

The masking sound adjustment method according to the third modification also outputs only the auxiliary content sound without including the masking sound in the band having the center frequency of lower than 500 Hz and in the band having the center frequency of higher than 4 kHz. Therefore, the masking sound adjustment method according to the third modification also further emphasizes the auxiliary content sound, further reduces discomfort and annoyance caused by the masking sound, and improves the masking effect of the masking sound.

The volume adjustment unit 103 reduces the volume of the masking sound to be lower than that in the first modification illustrated in FIG. 5. Since the masking effect of the masking sound is improved in the auxiliary content sound of the third modification, the masking effect of the masking sound can be maintained by the auxiliary content sound even when the volume adjustment unit 103 lowers the volume of the masking sound. Therefore, the masking sound adjustment method according to the third modification can further reduce discomfort and annoyance caused by the masking sound while exerting the masking effect.

The description of the present embodiment is to be considered in all respects as illustrative and not restrictive. The scope of the present invention is defined not by the above-described embodiments but by claims. Further, the scope of the present invention includes the scope equivalent to the scope of claims.

For example, in the masking sound adjustment method according to the above embodiment, the volume of the masking sound is adjusted based on the volume of the conversation sound acquired by the microphone 15. However, the masking sound adjustment method may adjust the volume of the masking sound based on a predetermined average volume of the conversation sound.

In the masking sound adjustment method according to the above embodiment, the volume of a sound signal of the masking sound to be output to the speaker 14 is adjusted. However, the masking sound adjustment method may adjust the volume (frequency characteristics) of the masking sound that is emitted from the speaker 14 and reaches the listener by adjusting the frequency characteristics of the speaker 14. Alternatively, the masking sound adjustment method may adjust both the sound signal and the frequency characteristic of the speaker 14 to adjust the volume (frequency characteristic) of the sound reaching the listener.

The present application is based on Japanese Patent Application No. 2020-134495 filed on Aug. 7, 2020, and the contents thereof are incorporated herein as reference.

REFERENCE SIGNS LIST

1 masking sound output device
11 processor
12 flash memory
13 RAM
14 speaker
15 microphone
101 volume acquisition unit
102 volume adjustment amount calculation unit
103 volume adjustment unit
104 BPF
121 masking sound adjustment program
201 acquisition unit
202 BPF
203 output unit

The invention claimed is:

1. A masking sound adjustment method comprising:

acquiring a masking sound and an auxiliary content sound for assisting the masking sound;

outputting the masking sound without outputting masking sounds having frequencies lower than a first frequency and higher than a second frequency; and outputting the auxiliary content sound including auxiliary content sounds having frequencies lower than the first frequency and higher than the second frequency, wherein the first frequency is a lower limit frequency of an octave band having a center frequency of 500 Hz, and wherein the second frequency is an upper limit frequency of an octave band having a center frequency of 4 kHz.

2. A masking sound adjustment device comprising:

a memory configured to store computer-readable instructions; and a processor configured to execute the computer-readable instructions stored in the memory to implement:

an acquisition unit configured to acquire a masking sound and an auxiliary content sound for assisting the masking sound; and an output unit configured to output the masking sound without outputting masking sounds having frequencies lower than a first frequency and higher than a second frequency and output the auxiliary content sound including auxiliary content sounds having frequencies lower than the first frequency and higher than the second frequency, wherein the first frequency is a lower limit frequency of an octave band having a center frequency of 500 Hz, and wherein the second frequency is an upper limit frequency of an octave band having a center frequency of 4 kHz.

3. A non-transitory computer-readable storage medium storing a program for causing a computer to execute the masking sound adjustment method according to claim 1.

* * * * *